Sept. 22, 1959     W. M. SCOTT, JR     2,905,786
INSTANTANEOUS LOCKOUT RELEASE FOR AUTOMATIC RECLOSER
Filed Nov. 2, 1956     5 Sheets-Sheet 1

INVENTOR.
WILLIAM M. SCOTT, JR.
BY
ATTORNEYS

United States Patent Office

2,905,786
Patented Sept. 22, 1959

2,905,786
INSTANTANEOUS LOCKOUT RELEASE FOR AUTOMATIC RECLOSER

William M. Scott, Jr., Bryn Mawr, Pa., assignor to I-T-E Circuit Breaker Company, Philadelphia, Pa., a corporation of Pennsylvania Application November 2, 1956, Serial No. 620,132

7 Claims. (Cl. 200—89)

My present invention relates to automatic reclosers, that is, the type of electrical switchgear arranged to open and reclose a number of times on fault current and to lock open after a predetermined number of openings within a limited period of time.

More particularly, my invention relates to the type of automatic recloser shown in Patent No. 2,487,025 to G. A. Matthews and is especially an improvement on the structure shown in copending applications Serial No. 113,371, filed August 31, 1949 now U.S. Patent 2,738,394, issued March 13, 1956, entitled Automatic Recloser to G. A. Matthews and Serial No. 396,962 filed October 12, 1953, all assigned to the assignee of the instant invention.

Automatic reclosers for which my invention is particularly adapted are provided with a time delay mechanism arranged and coordinated with the operating mechanism so that the first opening of the recloser is substantially instantaneous with all subsequent openings being time delayed.

After a predetermined number of opening operations, the automatic recloser is locked open since it is then assumed that the repeated closings, even with time delay, will not be able to clear the fault which may then exist on the line. However, when the automatic recloser is automatically locked open, means are provided to defeat the timer. Thus, in order to manually reclose the automatic recloser, means are provided to allow the timer to run out and then the lockout latch is released to permit the automatic recloser to reclose.

However, with this required sequence of operation, the first opening of the recloser following release from lockout will be substantially instantaneous as all of the components have been re-set. However, in practice it has been found that since it is necessary to manually re-set the automatic recloser following lockout, there is necessarily a substantial time interval during which time all of the loads are not being energized.

Thus, when the automatic recloser is manually released from lockout and its cooperating contacts again enable the loads to be energized, there will be a large value of in-rush current particularly if the loads are rotating equipment, such as motors.

Accordingly in this type of situation it has been found that the large magnitude of in-rush current which flows immediately following the release of the automatic recloser from lockout may cause an instantaneous initial opening of the recloser.

It is a primary object of my invention to provide an arrangement whereby the automatic recloser has a short time delay initial opening for a predetermined interval of time after reclosing following lockout to thereby take care of in-rush current and after the magnitude of in-rush current has decreased to the magnitude of rated current the initial opening on the occurrence of the next fault will be instantaneous without any intentional time delay.

Thus, after a predetermined interval, the occurrence of a fault current will result in a substantial instantaneous initial opening operation of the automatic recloser. This is achieved by providing means for the automatic recloser wherein the unit is released from lockout without causing the timer to run out. Thus the timer, following release from lockout, will be effective to delay the initial opening operation of the contacts when the automatic recloser is subjected to in-rush current immediately following reclosing.

However, after a short interval of time the timer will run out so that if the recloser is thereafter subjected to overcurrent or fault current, it will have a substantially instantaneous initial opening operation.

Thus the instant invention by-passes the timer when the recloser is manually operated whereas the prior art arrangements either wait for the timer to run out naturally or else accelerate the timing mechanism during manual operation and because of this the old reclosers are responsive to in-rush currents.

The structure shown in aforementioned U.S. Patent 2,738,394 provides, following a predetermined number of operations, means whereby the recloser may be locked-out if the fault current does not clear. When lock-out or locked-open conditions prevail, a primary latch holds the contacts separated against the force of a closing spring.

In the series of automatic opening and closing operations of the recloser, the primary latch is also effective in holding the contacts separated during the delayed closing operations. A timer arm, moved by a coil spring, has its rate of movement controlled by a timer mechanism, the movement of this timer arm after a predetermined time delay, permits the release of the primary latch to allow contact re-engagement.

When electrical lock-out conditions prevail, a secondary latch is brought into engagement which prevents the movement of the timer arm. Thus the timer arm, locked in position by the secondary latch, is not able to rotate into the position which permits release of the primary latch. The contacts thus remain separated under the influence of the primary latch and lock-out conditions prevail.

Lock-out release is accomplished in three manual steps. The first step removes the timer arm and secondary latch from the influence of the timer mechanism thus permitting the timer mechanism to reset to its normal position. When an appropriate interval, usually about 15 seconds, has elapsed the second step can be performed which will substitute an auxiliary latch to replace the primary latch. The third step, which may be performed with no intentional time interval from the second step, releases the auxiliary latch to permit reengagement of the contacts under the influence of the closing spring.

This procedure for lock-out release is not satisfactory since it requires an excessive period of time to perform during which time the operator is quite often in an awkward position or exposed to the elements.

It is a primary object of my present invention to reduce the lock-out release time to about 1 second.

My present invention adds an instantaneous lock-out release lever and pull ring to the recloser theretofore described. The lever is so constructed and positioned that a downward force on the pull ring will permit release of the primary and secondary latches and allow the closing spring to drive the contacts closed.

Thus, a lock-out release means will allow contact re-engagement in a manner completely independent of the timer mechanism and timer arm.

Accordingly, an object of my invention is to provide an instantaneous lock-out release means.

A primary object of my invention is to provide an automatic recloser which has time delay characteristics immediately following release from lock-out and thereafter has instantaneous initial opening operation on the occurrence of a fault current.

Another object of my invention is to provide a novel arrangement which will prevent the automatic opening of the recloser due to inrush current on release from lock-out.

A further object of my invention is to provide a lock-out release mechanism which can perform the lock-out release operation in one step.

A still further object of my invention is to provide a lock-out release structure which operates independently from the timer mechanism and timer arm.

Another object of my invention is the adoption of means to an automatic recloser which can release the recloser from electrical lock-out in a period of one second.

These and other objects of my invention will be apparent from the following description when taken in connection with the drawings in which:

Figures 8 to 11 are relative to opening operation of the contacts, whereas Figures 12 to 14 are descriptive of reclosing and time delayed opening operations. Figure 15 schematically shows the position of these control elements in the lock-out condition after a specific number of openings and reclosures have occurred. Figure 11 is also descriptive of the position of the latches and associated mechanism for release after lock-out to permit reclosure.

Figures 1, 2:
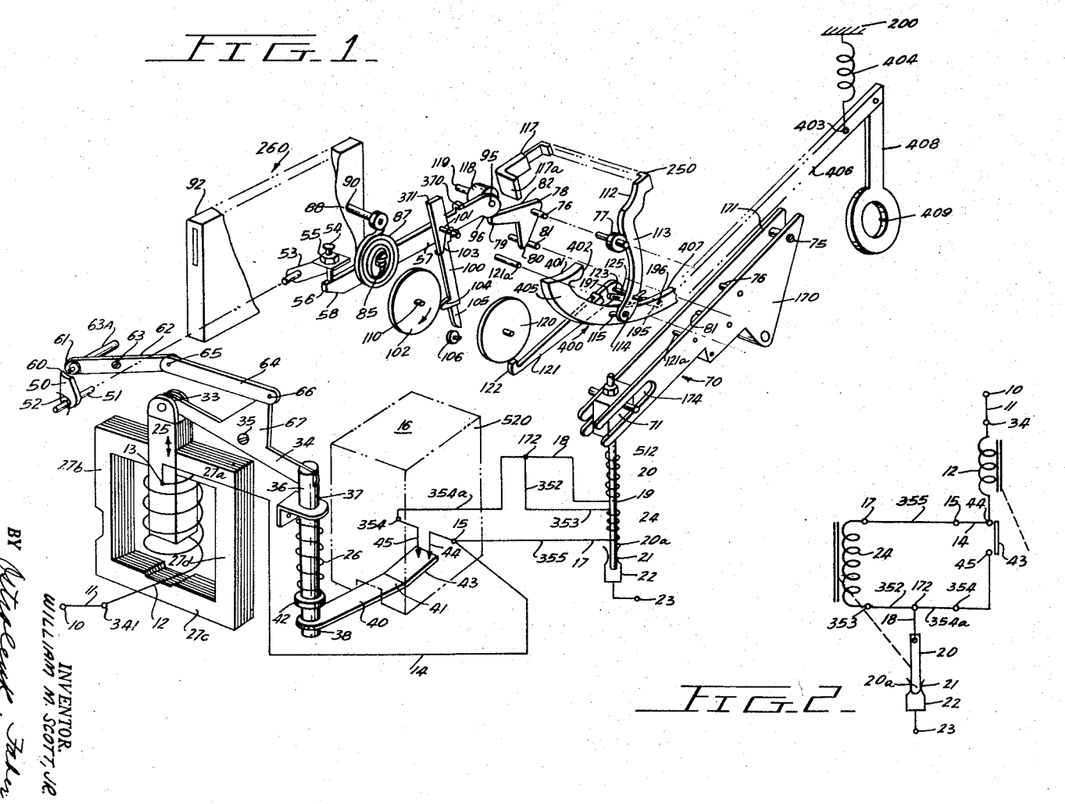
Figure 1 is an exploded schematic view in perspective of the operating elements of an automatic recloser and illustrates my novel instantaneous lock-out release.
Figure 2 is a circuit diagram showing the circuit connection between the operating elements of the automatic recloser.

Referring first to Figures 1 and 2, there is here shown schematically the novel automatic recloser which is essentially a circuit breaker so arranged that it is biased closed by spring 512 and may be opened by an opening coil 24, the armature 20 of which carries the movable contact 20a, the opening operation being against the bias of the closing spring 512.

*Interior operating parts*

The operating mechanism which controls the opening movement and also time delays the recloser and which mechanically defeats the closing spring after a predetermined number of reclosers is all shown schematically in Figure 1.

All of the elements of Figures 1 and 2, except of course the external terminals 10 and 23 as well as other elements, are contained within a casing, the operating elements of Figure 1, being located in the operating chamber of the casing and the moving contact plunger of the stationary main contact and the operating coil being positioned in a lower chamber below the main operating chamber.

*Circuit connections and general operation*

During normal operations, the electrical elements of the recloser are connected at terminals 10, 23 in series with the power line which is to be protected by the recloser. This circuit extends from terminal 10, conductor 11, connector 341, through winding 12 of the control magnet, conductor 14, connector 15, contacts 44 and 45 bridged by switch operation member 43, connector 354, conductor 354a to connector 172 and lead 18, to rod 20, stationary contact 21, 22 to the power line terminal 23.

It will be noted that with contact 537 bridging the contacts 44, 45, the winding of operating magnet 24 is by-passed so that normally substantially no current flows through and, therefore, there is substantially no loss due to current flowing in this winding. However, the windings of control magnet 12 are connected in series with the power line and are, therefore, energized by line current. On predetermined energization of the control magnet 12, in response to a fault current in the power line, lever 40 which carries contact 43 is moved, as will hereinafter be described, to open the bridge across contacts 44, 45, thereby inserting the winding of operating magnet 24, in series with the winding of control magnet 12 and the power line. Magnet 24 is now energized in response to the fault current to operate its rod 20 to contact disengaged position.

Following separation of the main contacts 21 and 20a, the arc which is formed on the opening of the circuit at that point is extinguished and results in de-energization of the operating coil 24. Thereupon the reclosing spring 512 drives the plunger 20 down to re-establish current carrying connections between the main movable contact 20a and the main stationary contact 21.

The operating mechanism shown schematically in Figure 1 is designed to provide appropriate controls for circuit opening operations and for the reclosing operations, so that successive reclosing operations may take place with a desired time delay interval between them and so that the plunger 20 may be locked in the up or disengaged position after a predetermined number of reclosing operations.

*Control coil and associated armatures*

The control coil 12 is arranged so that in response to a fault current of predetermined value in the circuit which is protected control coil will be sufficiently energized to move solenoid armature 25 connected to the control switch 16 and thus to open the control switch.

The control coil 12, therefore, is the initial operating coil of the entire system. Control coil 12 is essentially a solenoid coil surrounding the armature 25 which is normally biased above the coil by compression spring 26 in the manner hereinafter described.

The armature 25 is preferably a laminated iron structure, a portion of which forms, together with the laminated magnetic rectangular plates 27a and 27b and with 27d and 27c, magnetic paths for the flow of flux in response to energization of the control coil 12.

The control coil 12 has the function, when energized, to a predetermined value in excess of normal current value, to attract the armature 25 against the bias of the compression spring 26.

*Connection of control coil armature and toggles to control switch*

The upper end of armature 25 is connected by pin 33 to the lever 34 which is pivotally mounted on the stationary pivot 35. The opposite end of the lever 34 is connected by pivot 36 to the connecting rod 37. The lower end of connecting rod 37 is connected by pin 38 to the control switch operating lever 40.

Control switch operating lever 40 is pivotally mounted on the pivot 41. Compression spring 26 compressed between the stationary collar 42 and the end of lever 40 at pivot 38 surrounds the connecting rod 37.

Figures 3, 4, 5:
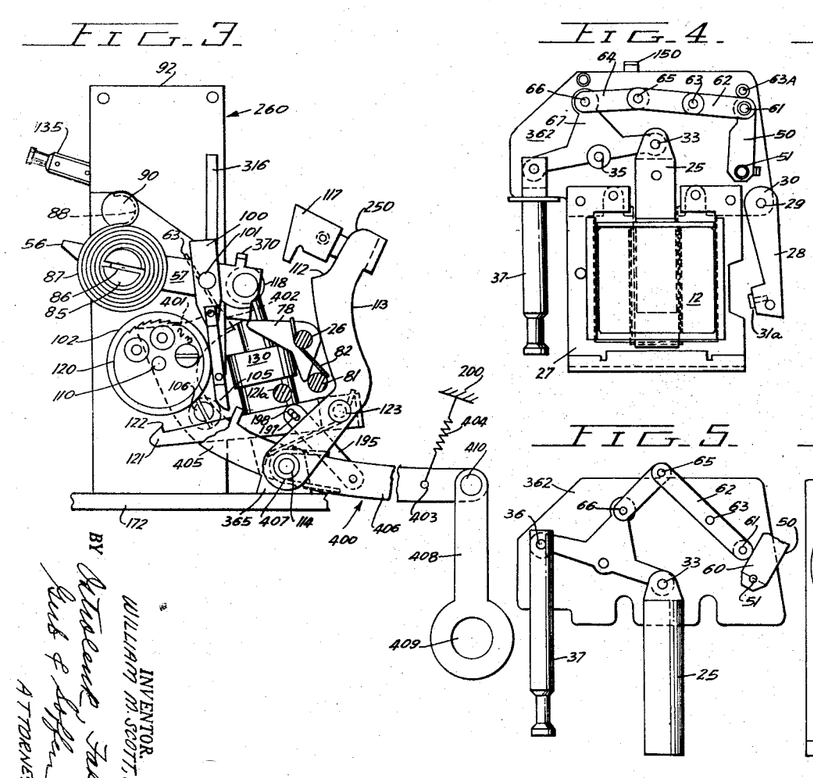
Figure 3 is a side view of the timer mechanism, timing arm, timing ratchet, lock-out latches and my novel instantaneous lock-out release.
Figure 4 is a side view of the control coil and its associated armature.
Figure 5 is a schematic view corresponding to Figure 4 but showing the trip position of the control coil.

Compression spring 26 drives the lower end of connecting rod 37 and therefore the left-hand end of control switch lever 40 downwardly, thereby pulling down the right-hand end of lever 34, lifting up the left-hand end of lever 34 and exerting an upward initial bias on pin 33 and armature 25. Spring 26 by this means normally maintains the armature 25 in the raised position partly outside of the control coil 12 as shown in Figures 1 and 4.

The right-hand end of the control switch lever 40 is provided with the contact section 43 normally bridging the stationary contacts 44, 45 of the control switch 16 and being held in bridging engagement therewith by the compression spring 26 which drives the left-hand end of lever 40 down as previously described.

On energization of control coil 12 to a sufficient value, armature 25 is moved, rotating lever 34 in a counterclockwise direction around pivot 35 and raising the connecting rod 37 upwardly against the bias of compression spring 26.

This results in a clockwise rotation of lever 40 and the movement of the bridging contact 43 away from the stationary contacts 44 and 45 of the control switch 16.

Accordingly, the current value at which the control coil 12 will be energized sufficiently to attract the armature 25 may be determined by the compression of compression spring 26 and may if desired (but not preferably) be calibrated by making collar 42 adjustable.

The "drop out" characteristic of the control relay is important. It is desirable for reclosers to have this feature in order to protect the normally shunted operating coil from carrying load currents which would burn them out. In case that a fault clears from a line (such as by self-clearing or by the blowing of a distribution transformer primary fuse) before the power contacts have had time to open but after the control contacts have opened, the load current returns to normal.

Unless a high "drop-out" value is afforded, the control armature stays in the fully attracted position by the load current, thereby holding the control contacts open. This causes the load current to pass through the operating coil which is normally shunted. The drop out value should be at least 80% of the full load rating. The present recloser provides suitable drop out by including a non-magnetic plate which prevents the armature from sealing in against the magnetic pole face.

Control coil calibration

However, a simpler and more accurate degree of adjustment is provided by the opening latch 50 keyed to and mounted on the rotatable pin 51, the opening latch 50 being spring biased in a clockwise direction with respect to Figure 1 toward latching position by the coil spring 52.

Pin or shaft 51 carries the lug 53 secured thereto and rotatable therewith, which lug carries at its outer end pick-up calibrating screw 54 which is adjustably mounted in the lug 53 for upward and downward movement on rotation of the screw 54 and which may be locked in the adjusted position by the locknut 55.

The lower end of the pick-up calibrating screw 54 bears against the forward end 56 of the timer arm 57. The opening latch 50 is provided with the latching detent 60 so arranged that it provides a detent or ledge against which the roller 61 at the end of lever 62 may bear.

Lever 52 is pivotally mounted on the stationary pin 63. The end thereof opposite the roller 61 is in toggle relation with the link 64, being connected thereto by the knee pin 65. The opposite end of toggle 62, 65, 64 is connected by pin 66 to the upwardly extending arm 67 of the lever 34.

When, therefore, the armature 25 is attracted downwardly by energization of the control coil 12 to rotate the lever 34 in a counterclockwise direction, it not only must compress the spring 26 but also must operate against the holding force of the latch 50 so that the toggle 62, 65, 64 may collapse to the position shown in Figure 5.

The armature 25, therefore, cannot be pulled down by coil 12 unless the roller 61 bearing against the latching detent 60 displaces the opening latch 50 in a counterclockwise direction with respect to Figure 1 or in a clockwise direction with respect to Figure 5.

The pick-up calibrating screw 54 bearing against the forward end 56 of the timer arm 57 determines the angular position of the pin 51 and the opening latch 50 thereby determining the degree to which the latching detent 60 of the opening latch 50 underlies the roller 61 at the end of toggle 62, 65, 64. Pin 63a bearing on the top surface of lever 62 ensures that roller 61 will ride in latching detent 60.

The degree to which the detent 60 underlies the roller 61 determines the initial force required to displace the opening latch 60 in order to permit the armature 25 to be moved down by coil 12. The greater the displacement of the opening latch 50 in a counterclockwise direction (with respect to Figure 1) the less force required to push the roller 61 off the latching detent 60 to rotate the opening latch 50 from the position of Figure 4 to the position of Figure 5.

The greater the adjustment of the latch 50 in a counterclockwise direction with respect to Figures 4 and 5, the greater the force required for this displacement.

Accordingly, the adjustment of pick-up calibrating screw 54 which determines this initial angular displacement of the opening latch 50 determines the force and hence the over current condition required before initiation of operation of the apparatus.

When, however, this displacing force is reached, armature 25 is pulled down by control coil 12; roller 61 of toggle 62, 64, 65 rolls off latching detent 60 and against the side of the opening latch 50; the opening latch 50 is rotated in a clockwise direction to the position of Figure 5 while toggle 62, 65, 64 collapses to the position of Figure 5; the connecting rod 37 is raised; switch operating lever 40 is rotated, and bridging contact 43 moves out of engagement with the stationary contacts 44 and 45 of the control switch 16.

With the control switch 16 thus opened, the full current passes through the operating coil 24 which attracts the plunger 20 pulling it upwardly and departing the main movable contact 21 from the main stationary contact 22 to open the circuit.

The upper end of the plunger 20 is connected to the operating arm 70 by the yoke connection 71 in such manner that the upward movement of plunger 20 must necessarily result in upward rotation of the operating arm 70 and vice versa.

Timer arm and associated latches and time delay ratchets

The operating arm 70 is rotatably mounted on the stationary pivot 75 at the end opposite its connection at 71 to plunger 20.

Operating arm 70 carries intermediate its ends and extending transversely with respect thereto the pin 76 on which are rotatably mounted the main latch roller 77 and the pawl 78. Pawl 78 is essentially a bell crank lever in form, having a timer arm engaging leg 79 for engagement with arm 57 in the manner hereinafter described and a downwardly extending positioning leg 80.

Figures 16, 17, 18, 19, 20, 21, 22, 23:
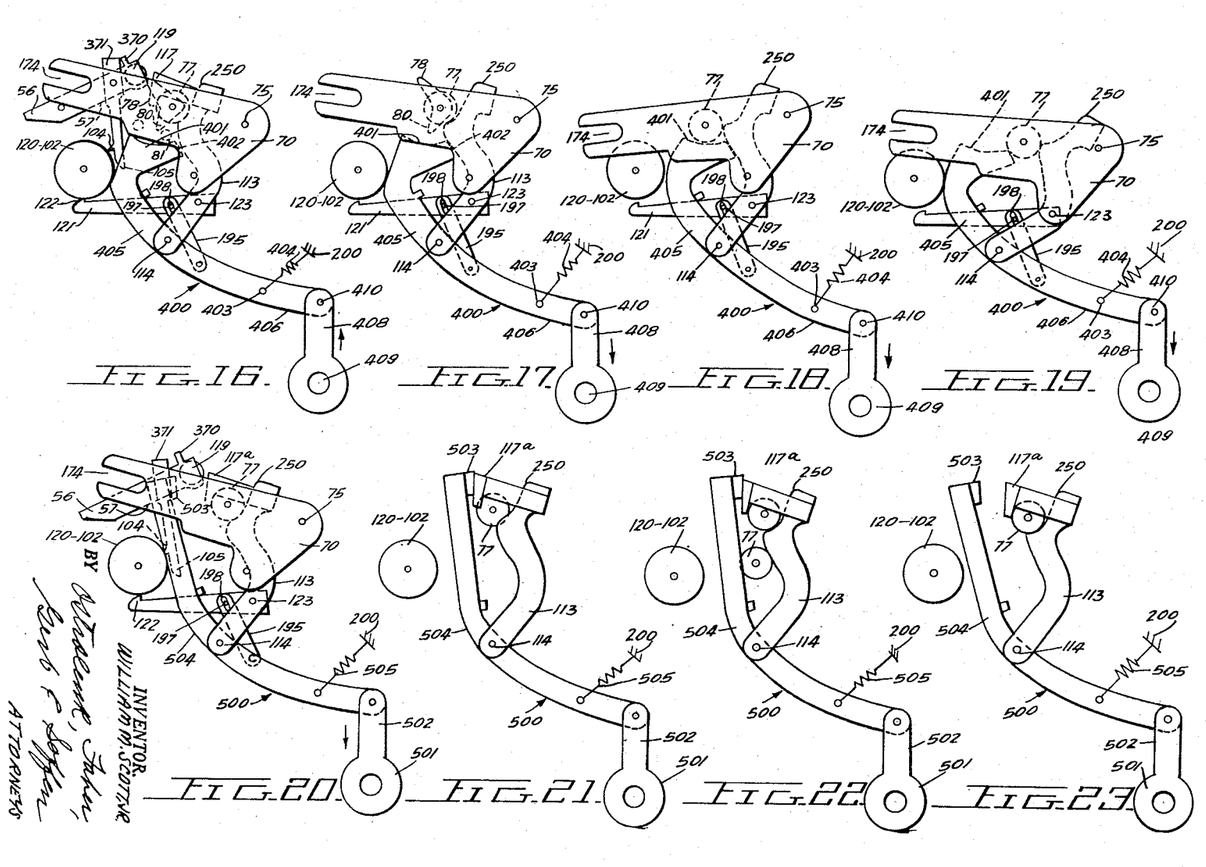
Figures 16 to 19 are schematic illustrations similar to Figures 8 to 15 and illustrate successive steps for a first embodiment of my novel instantaneous lock-out release.
Figures 20 to 23 are schematic illustrations similar to Figures 8 to 15 and illustrate successive steps for a second embodiment of my novel instantaneous lock-out release.

In the normal at rest position of the operating arm 70, shown schematically in Figure 20, the positioning leg 80 of pawl 78 is driven by coil spring 82 against the stop pin 81 carried by the operating arm 70.

The timer arm 57 as is shown in Figures 1 and 3 is provided with a slotted pin 85 receiving the end 86 of coil spring 87. Coil spring 87 is wound around the slotted pin 85 and the outer end 88 thereof is connected to the stationary pin 90 carried in a lug extending from the side of the timing mechanism housing 92.

Coil spring 87 is so adjusted that the timer arm 57 in the normal closed circuit position of the apparatus is substantially horizontal. When the timer arm 57 is rotated in a counterclockwise direction with respect to Figures 1 and 8, the coil spring 87 is tensioned tending to rotate the timer arm 57 back toward the substantially horizontal position.

Timer arm 57 has a rearward extension 95 with a rounded under surface 96 which will be engaged by the upper surface of leg 79 of pawl 78 when the operating arm 70 begins to rise (compare Figures 9 and 8) during the upward movement of the plunger 20.

Thus, as the operating arm 70 rises, the pawl 78 lifts the rear end 95 of the timer arm 57 rotating the timer arm as above described and thereby lifting the time delay pawl lever 100 which is connected by the pin 101 to the timer arm 57 between the pin 85 and the end 95 of the timer arm 57.

Time delay pawl lever 100 is biased in a clockwise direction toward the time delay toothed ratchet 102 by the coil spring 103. Time delay pawl lever 100 is provided with the pawl tooth 104 which bears against the time delay circular ratchet 102.

Figure 8:
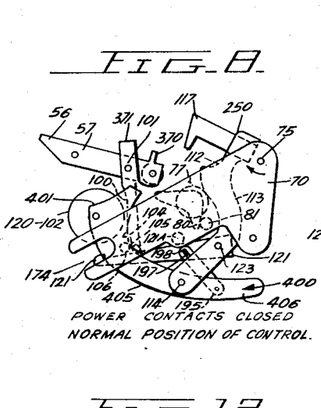
Figures 8 to 15 are schematic views showing the successive positions of the latching mechanism in association with the timer mechanism.

Lever 100 also is provided with the extension 105 below the pawl tooth 104 having a cammed surface which bears against the pin 106 carried by the housing 92 of the timer mechanism and which in the normal at rest position of the operating mechanism with the switch contacts closed maintains the pawl tooth 104 out of engagement with the surface of the time delay ratchet 102 as shown in Figure 8.

Pin 106 is rotatable and is cam shaped to provide adjustment of the disengaging point of pawl 100. This is shown in Figure 3.

When, however, the operating arm 70 is raised about its pivot 75 owing to the lifting up of the plunger 20 by the operating solenoid coil 24 and pawl 78 thus lifts the end 95 of the timer arm 57, the time delay pawl lever 100 is lifted; and as soon as its extension 105 clears the pin 106, coil spring 103 drives the pawl tooth 104 against the surface of the time delay ratchet 102.

Figure 9:
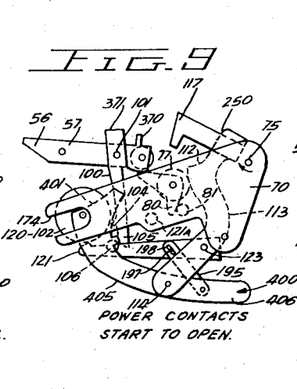
Figure 10:
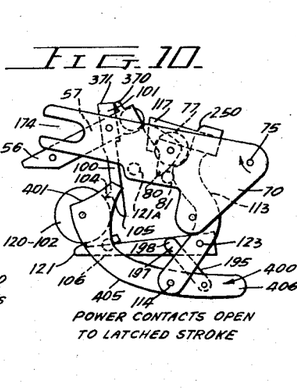

This is shown diagrammatically by the comparison of Figures 9 and 10.

The pawl tooth 104 of the time delay pawl lever 100 rides up the surface of the time delay ratchet 102 without rotating the same owing to the curvature of the teeth 107 of the ratchet 102 (see also Figures 6 and 7) and also owing to the fact that certain portions 108, 109 may be made smooth and without the teeth 107 for the purposes hereinafter more specifically described.

Reclosing time delay

From the description thus far, it will be apparent that in response to a predetermined fault current, control magnet 12 was energized, opening the shunt switch around operating magnet 24. Magnet 24 was then energized in response to the fault current and the circuit breaker contacts opened instantaneously. The contacts are latched in open position by engagement between detent 112 and roller 77. At the same time, energy was stored in a spring 87 which, now under control of a time delay mechanism 260 operates to release the principal latch 112—77.

As will be described more fully hereinafter, contacts 21, 20a are opened in an arc chamber in which the resultant arc following circuit interruption is extinguished. The operating magnet 24 is de-energized and the plunger 20 is now operable under action of a biasing spring 512 to reclose contacts 21, 20a as soon as the time delay releases the latch 77—112.

The operating arm 70 is provided with a rigidly attached pin 121a as noted in Figures 1 and 3 and observed in Figures 8 to 15. The pin 121a is positioned above the lock-out pawl arm 121 and below the timer arm 57. When the contact 20a and 21 are in engagement the pin 121a is effective in holding the pawl arm 121 down, against the force of its bias spring 125 and away from the lock out ratchet 120 (see Figures 8 and 14). When contact separation occurs the clockwise arc movement of pin 121a on operating arm 70 serves to release the lock-out pawl arm 121, as seen in Figure 9, to allow said arm to rotate clockwise under the influence of its bias spring 125. This rotation brings the arm 121 into engagement with the ratchet 120 as seen in Figure 9 and hereinafter to be described. Upon continued rotation of the operating arm 70 and pin 121a, the said pin will contact the under surface of timer arm 57 and complete the rotation of this arm to the full-open stroke position of Figure 11. However, the operating arm 70 will reverse its rotation at this point and under the influence of the spring 512 will rotate to the locked position of Figure 12. This action removes the pin 121a from the under-side of time arm 57 to permit that arm to return to its normal horizontal position under the influence of the coil spring 87 and time delayed by the timer mechanism 260 within the timer housing 92.

The ratchet 102 is keyed to the timer shaft 110 which is under the control of the timing mechanism 260 within the timing mechanism housing 92. Assuming that the first reclosure is to be delayed, then the teeth 107a (Figure 6) of ratchet 102 are so positioned, also in a manner hereinafter described, that the pawl tooth 104 will engage the teeth 107a at the upper limit of movement of the timer arm 57, lever 100 and pawl tooth 104 (as shown in Figure 12).

Figure 11:
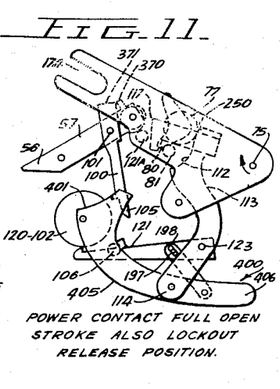

Figure 11 shows the fully open position before reclosure starts. Timer arm 57 is held up by pin 121a.

Figure 12:
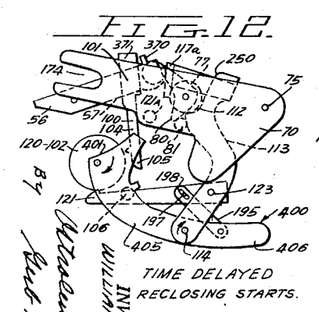

At this time, the leg 79 of pawl 78 has been moved through a sufficient arc by rotation on pin 76 to disengage the curved under surface 96 of the rear extension 95 of the timer arm 57, Figure 10, and the end 95 of the timer arm 57 is released to move downward and hence the time delay pawl lever 100 begins to descend (as indicated in Figure 12).

This descent is, however, delayed by the timing mechanism 260 in timing mechanism housing 92 which controls the rotations of shaft 110 and timing arm 57 cannot move instantaneously back to its original position under the influence of coil spring 87 but returns with a timed movement determined by the speed at which the timing mechanism in housing 92 permits the pawl tooth 104 to drive the time delay ratchet 102.

The main latch roller 77 seats in the latching detent 112 just prior to the disengagement of pawl end 78 from timer arm end 96 as shown in Figure 10. The principal latch 113 constitutes a lever arm pivotally mounted on the stationary pin 114 and biased toward the main latch roller 77 by the coil spring 115.

Also rotatably mounted about the stationary pin 114 is instantaneous lock-out release lever 400 to which my invention is directed. The lever 400 is a rigid unit consisting of an upper arm 405 which ends in a detent 401 and has an engagement surface 402. The detent 401 and engagement surface 402 are located in the same plane as the principal latch arm 113. The lower arm 406 of the lever 400 is provided with a hole or keyway 403 through which the biasing spring 404 can be attached. The spring 404 attached to the housing 200 provides a counterclockwise bias on the lock-out release arm 400 and holds it in the neutral position of Figures 8 to 15. It will be observed that the lockout release lever 400 will remain in this neutral position during the series of automatic opening and reclosure operations, since it is not mechanically linked to any of the operating parts. Movement of lock-out lever 400 only results when a force is applied to the pull-ring 408—409 (Figures 3 and 16 to 23) as hereinafter described.

When the main latch roller 77 carried by the operating arm 70 which is connected at 71 to the plunger 20, therefore, seats in the latching detent 112, the operating arm 70 and the connected plunger 20 are locked in the up position as shown in Figure 12. This latching detent 112 is high enough to ensure that pawl 78 will disengage the timer arm 57 and allow pin 121a to lift the timer arm 57 to the position of Figure 11. Latch roller 77 then moves down slightly with arm 70 and plunger 20 to rest on detent 112 as noted in Figure 12.

As previously pointed out, a compression spring 512 hereinafter described, has been compressed by the upward movement of plunger 20 to bias the plunger 20 downwardly to the position in which contacts 21 and 20a will engage. This compression spring is, however, defeated by the interengagement of the main latch roller 77 with the latching detent 112 of the principal latch 113.

The principal latch 113 has a U-shaped extension 117 arranged in the path of movement of roller 118 carried on pin 119 at the rear end 95 of the timer arm 57.

Figure 13:
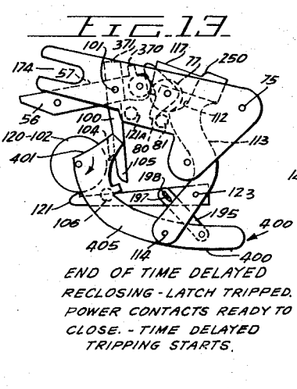
Figure 14:
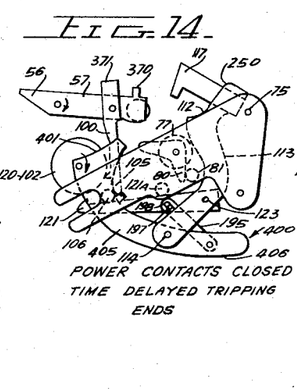

As the timer arm 57 returns toward its original position under the influence of coil spring 87 and delayed by the time delay mechanism 269 in housing 92 which acts through the time delay pawl lever 100 on timer arm 57, a device such as roller 118 engages the end of the U-shaped extension 117 of the principal latch 113 and pushes the latch 113 back far enough so that the latching detent 112 moves out from under the main latching roller 77 permitting the reclosing spring 512 to drive the plunger 20 and the operating arm 70 down to effect re-engagement of contacts 21, 22 (see Figure 13).

Accordingly, it is the return movement of the timing arm 57 which disengages latch 113 from the main latching roller 77 and the time delay which operates on the timer arm 57 determining the degree to which reclosure will be delayed.

The timing mechanism may, therefore, be adjusted to any desired speed and this adjusted speed will be effective to control the return movement to the timing arm 57, which in turn will control the unlatching of the operating arm 70 and the plunger 20.

Figure 6:
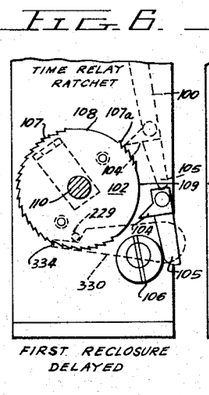
Figures 6 and 7 are schematic illustrations of the operation of the time delay ratchet.
Figure 7:
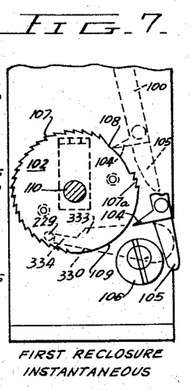

After the completion of the clockwise rotation of timer arm 57 the curved extension 105 of the reclosing time delay pawl lever 100 moves against the pin 106 to move the pawl tooth 104 out of engagement with the teeth 107 and 107a of the time delay ratchet as the case may be (Figure 6).

At this time, the timing mechanism which was wound up by the rotation of ratchet 102 by timer arm 57 in a clockwise direction with respect to Figures 3, 8 to 15 and 6 will now be free to rotate the time delay ratchet 102 and its shaft 110 back to the original or neutral position.

This return movement of the timer shaft 110 and the time delay ratchet 102 will, however, be under the control of the timing mechanism. The time for the return of the time delay ratchet 102 will not necessarily be the same as was required for the original movement. In the first place, the spring 87 which causes the forward movement and the spring in the timer hereinafter described which causes the return movement are of different strengths and, in addition, the return movement is always at the same rate, which is the slowest speed of operation of the timer. On the other hand, the forward movement, which consists of two parts, is at a slow rate for the first portion of its travel. The rate is not necessarily the same as under the return portion since a much heavier spring is operated. In addition, the second portion of travel in the forward direction is under the influence of the heavier spring and at a variable rate of operation depending on the magnitude of the short circuit current as hereinafter described.

If this return movement is completed before the next opening operation, then the next opening operation occurs as if it were the first opening operation of a series and the first and subsequent reclosures will occure as if they were the first of a series.

If, however, this return movement has not been completed before the next opening operation, then on the next opening operation, pawl 104 will engage teeth 107 of the time delay ratchet 102 at a position angularly displaced from the first engagement. The main latch roller 77 will be engaged and held by the latch 113 and the timer arm 57 will again descend under the control, however, of the timing mechanism in housing 92 translated to the timer arm through the timer shaft 110, ratchet 102 and lever 100.

If the next opening of the circuit breaker occurs before the timing mechanism in housing 92 has had an opportunity to begin to return the ratchet 102 and shaft 110 back toward the initial position, then the return of the timing arm 57 under the control of the time delay mechanism will add cumulative angular rotation to the ratchet 102 and shaft 110.

Lockout

It is essential in the operation of the novel circuit recloser that the contacts be locked open after a predetermined number of reclosing operations.

Thus, in the event the initial cause for opening of the contacts was some transient fault in the line, the recloser may close and remain closed. An example is the case of arcing over at an insulator on the line owing to the unusual transient condition, in which case momentary interruption of current occasioned by one opening and reclosure of the contacts will result in extinguishment of the arc which will not then ordinarily reignite owing to the fact that the ionized gases would normally be blown away or otherwise cooled. This will also be the case if wires have accidentally swung together in a high wind.

Moreover, if some relatively high resistance member has caused the fault, the first or second reclosure of the automatic recloser may serve to burn away the cause of the fault and the automatic recloser contacts should then remain closed to maintain the circuit after the fault has been burned away.

If, however, the opening of the contacts resulted from a true short circuit condition which will not be cleared by repeated openings and closings of the automatic recloser, it then becomes essential to lock the automatic recloser open. This is the principal reason for making the angular movements of the time delay ratchet 102 and the timer shaft 110 cumulative on rapidly repeated reclosures.

After a predetermined number of such reclosures as after the second or third reclosure, this cumulative rotation of the reclosing time delay ratchet 102 and the timer shaft 110 may be utilized to bring a lock-out mechanism into operation.

The lock-out mechanism comprises a lock-out ratchet 120 on the timer shaft 110 co-axial with but spaced from the reclosing time delay ratchet 102 and a lock-out pawl lever 121 having a pawl tooth 122 and connected at its opposite end by pin 123 to the principal latch 113.

A coil spring 125 biases the lock-out pawl lever 121 upwardly so that the pawl tooth 122 bears against the surface of the lock-out ratchet 120. The lock-out ratchet 120 is as seen in Figures 24 and 25 is smooth at 126 over a substantial portion of its surface and is provided with teeth 127 over another portion of its surface.

In the original condition of the elements, after a first opening, the pawl tooth 122 engages the smooth section 126 of the surface of the lock-out ratchet 120 whenever the latch 113 is in latching engagement with the roller 77.

After a repeated number of reclosures, however, resulting cumulative rotation of the timer shaft 110, time delay ratchet 102 and lock-out ratchet 120, the teeth 127 of the lockout-ratchet 120 move into position to be engaged by the pawl tooth 122 on the next opening operation when the latch 113 next moves to a position where it receives and holds the latch 77.

Figure 24:
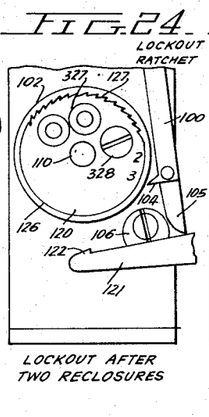
Figure 24 is a schematic view of the lock-out ratchet when set to lock-out after two reclosures.
Figure 25:
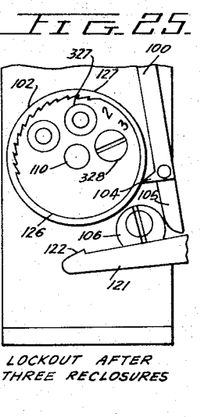
Figure 25 is similar to Figure 24 and shows the lock-out ratchet set to lock-out after three reclosures.

When on an opening operation the latch 113 engages the roller 77 to lock the operating arm 70 and plunger 20 in the up position and when the pawl tooth 122 engages the teeth 127 of the lock-out ratchet 120, remembering that the ratchets 102 and 120 are rotated in a clockwise direction with respect to Figures 6 and 24 as the timer arm descends, the teeth 127 are so curved that they will be locked by the pawl tooth 122 for such clockwise rotation and the pawl tooth 122 on the lock-out pawl lever 121 will prevent such further rotation by the timer shaft 110 and ratchets 102 and 120.

Figure 15:
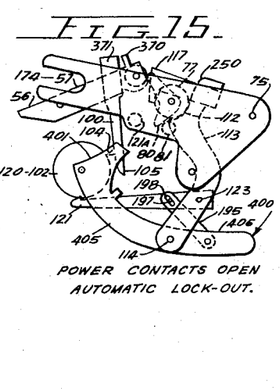

Hence, the timer arm 57 and its pawl lever 100 cannot now descend and the automatic recloser mechanism is now locked out (as shown in Figure 15). This is true since, as pointed out above, it is the descent of the timer arm 57 that is necessary to push the principal latch 113 away from the latching roller 77; and the timer arm cannot now descend.

The lock-out ratchet 120, as hereinafter described, may be made angularly adjustable about the shaft 110 so that the angular position of shaft 110 at which the teeth 127 move into conjunction with the pawl tooth 122 may be determined or set in accordance with the number of reclosures to be had before the lock-out position is reached.

The interlock arrangement does not permit lock-out with the main contacts closed. Pin 121a holds lock-out pawl tooth 122 away from lock-out ratchet 120.

*Time delay on re-opening*

When the contacts 21—20a open, on the lifting of the plunger and operating arm 70, then, as stated hereinbefore, the control coil 12 is de-energized and spring 26 returns the control switch 16 and the control armature 25 back to their original positions with the control unit returning from the position of Figure 5 back to the position of Figure 4. Owing to the fact that the end 95 of the timer arm 57 is raised, the forward end 56 of the timer arm 57 is lowered and thus it moves away from the pickup calibrating screw 54.

Consequently, coil spring 52 may now drive the opening latch 50 to a position where its detent 60 locks under the roller 61 of toggle 62, 65, 64. The latching detent 60 owing to the fact that the pick-up calibrating screw 54 at this point has nothing to rest on because of the lowering of end 56 of the timer arm 57 moves sufficiently under the roller 61 so that it absolutely locks the roller 61 and so that the roller 61 cannot push the opening latch 50 out for a tripping operation.

Energization of control coil 12 after closing of contacts 21—20a by descent of plunger 20 after release of latch roller 77 cannot now pull down the armature 25 to reopen the control switch 16 until the timer arm 57 completes its full return to its original position at this time, thereby permitting the reopening time delay hereinafter described to be effective, the end 56 of the timer arm 57 lifts the pick-up calibrating screw 54 to rotate lug 53, pin 51, and latch 50 back to the calibrated position at which the control coil, if properly energized, will pull down the armature 25 with sufficient force to cause the roller 61 to push the latch 50 aside.

As previously pointed out, after the timer arm 57 in its return movement under the control of the time delay ratchet 102 causes the latch 113 to release the main latch roller 77, the closing spring hereinafter described closes contacts 21 and 20a to re-establish the flow of current through the automatic recloser.

At this time, the switch 16 has been closed establishing a by-pass for the operating coil 24, and, therefore, the contacts remain closed. This reclosing of the circuit breakers occurs before the end 56 of the timer arm 57 has reached the pick-up calibrating screw 54.

Accordingly, the latch 50 and its detent are so located under the roller 61 at this point that the control coil 12 cannot pull down the armature 25 to open control switch 16.

With latch 50, therefore, locking the roller 61, the circuit breaker cannot at this time trip after the first reclosing operation even though a fault current may exist which would normally have energized coil 12 sufficiently to attract the armature 25 and open the switch 16. Such attraction of the armature 25 to open the switch 16 cannot occur until the end 56 of the timer arm 57 lifts the pick-up calibrating screw 54 to rotate the latch 50 to a position where the roller 61 may push it aside to permit collapse of toggle 62, 64, 65 and thereby permit the attraction of the armature 25 and opening of switch 16.

The timer arm 57 completes its movement to a point where it lifts up the pick-up calibrating screw 54 after a time delay.

From the above, it will now be clear that the recloser provides time delay for each reclosing operation and for each opening operation following the first instantaneous opening operation.

Both time delays are achieved with the same timing mechanism and with individual latches.

Inasmuch as reclosing is by spring operation, a first latch 112 locks the contacts in disengaged position. The time delay after a predetermined interval releases this first latch to permit fast spring reclosure of the contacts.

Since reopening is by magnet operation, a second latch 60 locks the armature of the control coil 12 which in turn controls the energizing circuit of the operating magnet. The time delay after a predetermined interval releases this second latch to effect energization of the opening coil 24 resulting in fast electromagnet opening of the contacts.

Although the second latch 60 is on the armature of the control magnet 27, which is preferable because the toggle 62, 65, 64 permits a light latch 60 to lock against a strong pull the net affect is to lock plunger 20 against movement. Accordingly the latch can be located anywhere in the mechanical or electrical system which controls movement of plunger 20 including a latch on plunger 20, it being understood that release of the latch would be controlled by the time delay mechanism.

Both the reclosing and reopening time delays are provided to automatically give the circuit time to correct the fault conditions if they can be corrected.

*Instantaneous release from lockout—first embodiment*

As previously pointed out, however, the reclosing time delay operates through one, two, three or more cycles to a lockout position depending on the degree of cumulative rotation of shaft 110 carrying ratchets 102 and 120 in the same direction.

After the lockout position previously described in connection with Figure 1 and illustrated schematically in Figure 15 is reached, it becomes necessary to release the parts of the automatic circuit recloser so that they may be placed in circuit once more after appropriate inspection and repair of the line has been made.

For this purpose, the instantaneous lock-out release lever 400 is used. The lever 400 is situated within the recloser in such a manner that the upper portion 405 is located with the interior operating parts and the lower extension 406 located with exterior operating parts. When the recloser is in the electrically lock-out position, noted in Figure 15, an operator may place the recloser in closed operating condition by inserting a switch stick in the pull ring 409 and exerting a downward force. When the force is released, the contacts 20a—21 will be engaged and the recloser will be in closed operating condition.

The operation of my novel lock-out release mechanism is as follows: When the pull ring 408—409 is pulled down, the initial movement of the lever 400 against the bias of spring 404 is from the position of Figure 15 to 16. Figure 16 shows the engagement extension 402 of lever 400 as it first contacts the primary latch arm 113. During the initial movement of lever 400 that takes place from Figures 15 to 16, pawl tip 122 is disengaged from teeth 127 of lockout ratchet 120. This disengagement is brought about by link 195 which is pivotally mounted at one end to lever 400 at pin 196 and is pivotally mounted at the other end to pawl 121 by means of pin 197 and slot 198. The lever 400 continues in clockwise rotation to the position of Figure 17 where it starts to rock the latch arm 113 clockwise around pivot 114 and against the bias of spring 115. This action moves the latch detent 112 beneath the latch roller 77. Continued clockwise rotation of lever 400 by the pull ring 408 pushes the latch arm 113 still further to allow the detent 112 to be completely removed from beneath the latch roller 77. The latch roller 77 is then free to rotate about pivot 75 to the position of Figure 18. As the surface 401 is removed from beneath the latch roller 77, the operating arm 70 to which the roller 77 is attached, is free to rotate counterclockwise under the influence of closing spring 512. This brings the contacts 20a and 21 into engagement permitting the recloser to be in operating condition, and at the same time the pin 121a is driven against pawl 121 to continue the disengagement of pawl tip 122 from lock-out wheel 120 even after lever 400 is returned to its most counterclockwise position.

It should be noted that the time required to return the recloser from the lock-out condition of Figure 15 to the operating position of Figure 11 is less than one second. In the series of automatic closing operations of the recloser, the latch arm 113 served as a principal latch to hold the contacts separated. However, after a predetermined time delay, the roller 118 of the timer arm 57 would engage the U-shaped extension 117 of the latch arm 113. This would rock the arm 113 clockwise, remove the detent 112 from the roller 77 and permit contact engagement to take place as heretofore described. However, on instantaneous lock-out release, the movement of arm 113 to remove the principal latch is accomplished by means of the pull ring 408 and lever 400 and is completely independent of the timer mechanism. Thus, instantaneous release from lock-out release is possible.

It will be observed that when instantaneous lock-out release occurs, the counterclockwise rotation of the operating arm 70 drives the pin 121a against the top of pawl arm 121. Thus the pawl arm and its attached tooth 122 are removed from the teeth 127 on ratchet wheel 120. This releases the shaft 110 for rotation under the influence of coil spring 87 and pawl arm 100. Thus, after the lock-out release permits contact re-engagement, the time delay ratchet 102 is also released to permit timer arm 57 to return to its normal horizontal position of Figure 1 and 8.

Accordingly, after the recloser has been released from lock-out and the cooperating contacts 20a—21 have been reclosed, the recloser will have a time delayed reopening until the timer arm 57 has returned to its normal horizontal position of Figures 1 and 8 since the timing mechanism 260 has been by-passed. Thus, when the recloser is reclosed following a lock-out, the inrush current will not cause an instantaneous opening of the recloser. However, after a short interval of time the timer arm 57 will resume its normal horizontal position, and hence, the recloser will then have its standard instantaneous initial opening characteristic in the event of a fault.

Figure 26:
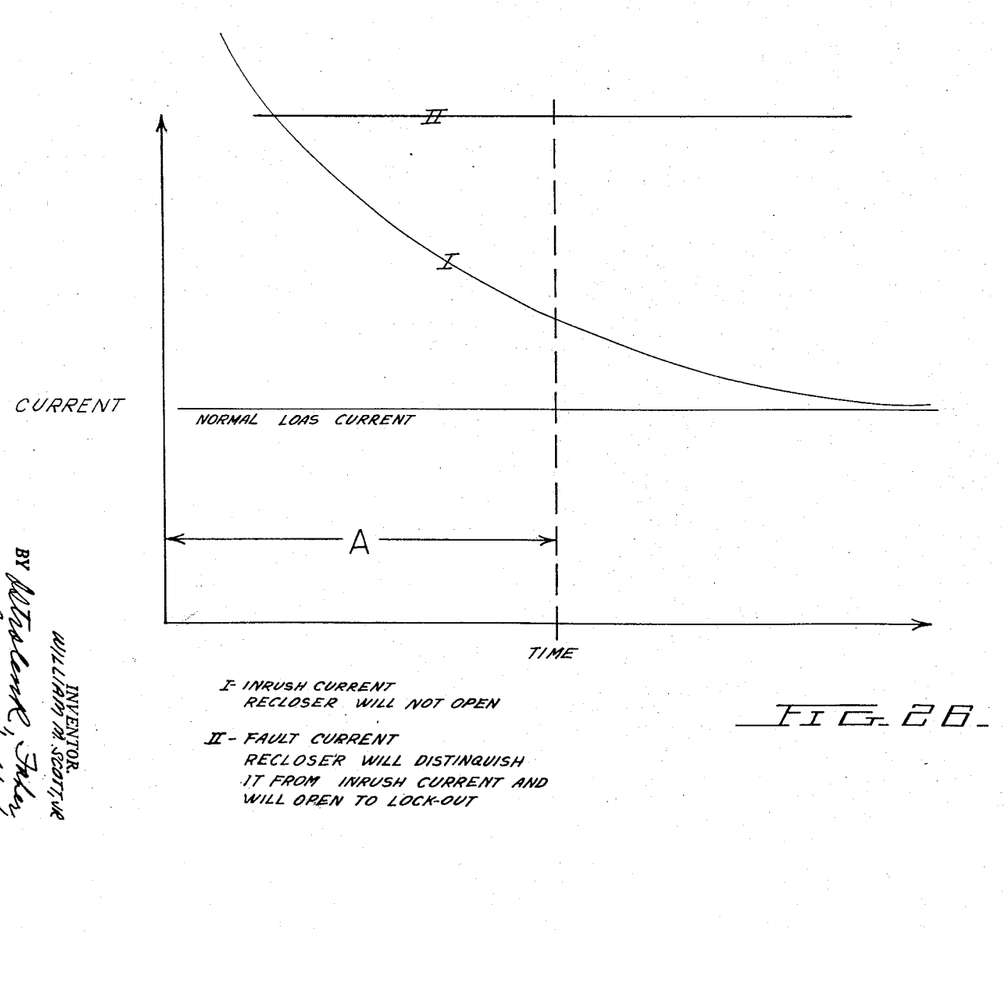
Figure 26 is a graphic illustration of the recloser characteristic following manual closing.

This is graphically illustrated in Figure 26 which is a plot of Time vs. Current. Horizontal line II is the value of fault current that will trip the recloser open and curve I is a plot of the typical in-rush current upon manual reclosing after a fault has cleared. It is apparent that the load current on closing far exceeds the current value necessary to trip the recloser. The high in-rush current may be due to rotating machinery, filaments, capacitive loads, etc. While the current is initially very high it decreases rapidly toward normal load current which is a value less than the fault current required to open the recloser.

The time interval A is the time that it will take energy stored in the by-passed timing mechanism 260 to run out. During this time interval A, the detent 60 is so positioned in a clockwise direction that control coil 12 is unable to exert a great enough pull on armature 25 to break the toggle 62, 65, 64 so that the opening coil 24 is inoperative since it is by-passed by contactor 43 bridging contacts 44, 45. After the timing mechanism 260 has run out the forward end 56 of timer arm 57 is raised to engage the calibrating screw 54. The detent 60 is now positioned to permit control coil 12 to be effective in moving the armature 25 and thus the recloser is restored to its ordinary cyclic sequence of operation.

If load current value at time A is below fault current II the recloser will not open but if the load current value at time A exceeds fault current II any time after interval A, the recloser will go through its predetermined sequence of operation and will lock-out if the load current exceeds fault current II at the end of a predetermined number of cycles. In this way the recloser distinguishes in-rush currents from fault currents.

The fact that the recloser will not trip open during interval A is most desirable. It enables rotating machinery to get up to operating speed and enables filaments to reach operating temperatures. Whereas, if the recloser were to operate instantaneously after manual closing the high in-rush currents would continue cycle after cycle and the recloser would go through its complete cycle to lock-out.

*Instantaneous lockout release—second embodiment*

Figures 20, 21, 22, 23 illustrate a second preferred embodiment of my invention. A pull ring assembly 500 is mounted on the recloser in place of the lockout release lever 400. The pull ring assembly 500 has a lever 504 which is pivotally mounted at pivot 114. A pull ring 501—502 is mounted on the right end of lever 504 and a projection 503 is mounted on the left end thereof.

The projection 503 on the pull ring assembly is positioned in the plane of the U-shaped extension 117 and aligned for eventual engagement with this bracket. The pull ring unit 501—502 is positioned on the extension of the recloser and placed so that it may easily be reached with a switch stick. When a switch stick is inserted in the pull ring 501 and pulled down, the pull ring assembly 500 is rocked clockwise against the bias of spring 505. This permits the extension 503 of rod 500 to engage projection 117a the U-shaped bracket 117 of the principal latch arm 113 and rock this arm clockwise about pivot 114.

Figure 20 illustrates the position of the parts in a lock-out position. The operator may release the recloser from this lock-out position by pulling down on the pull ring 501 so that link 195 will carry the pawl 121 downward and extension 503 will force the principal latch 113 clockwise thereby releasing the principal latch 113 from the latch roller 77. As the operator pulls down on the pull ring 501, the pull ring assembly 500 and latch lever 113 move progressively from Figures 20 to 21 to Figure 22. In the latter figure the main contacts 21—20a are in engagement. When the operator releases the force on the pull ring 501, the pull ring assembly 500 returns under the bias of spring 505 to its normal position, and the recloser is in its normal operating position as indicated in Figure 23.

It will be observed that the preferred embodiment of Figures 20 to 22 differs from the embodiment of Figures 16 to 19 in that there is no transfer of latch roller 77, but rather an immediate release thereof. That is, when the pull ring 501 is forced down, the recloser immediately returns to the normal closed position of the main contacts. Thus, the recloser may be transferred from the lock-out position to the normal contact closed position in a matter of less than a second and with little effort on the part of the operator.

However, both of the embodiments heretofore described operate independently of the timer mechanism 260 and release the recloser from the lock-out position to normal position without waiting for the timer mechanism 260 to return the shaft 110 and ratchets 102 and 120 to their normal position.

Since lock-out release is independent of the timer mechanism 260, it will be necessary for the timer to run out after the main contacts 20a—21 have reclosed. Thus, there is introduced a time delayed openings of the main contacts 20a—21 so that the recloser will not instantaneously open when it is subjected to inrush current. However, after a short interval, when the inrush current has died down and the timer mechanism 260 has returned the timer arm 57 to its normal horizontal position of Figures 1 and 8, the recloser will have an instantaneous initial opening without intentional time delay.

In the foregoing I have described my invention solely in connection with specific illustrative embodiments thereof. Since many variations and modifications of my invention will now be obvious to those skilled in the art, I prefer to be bound not by the specific disclosures herein contained, but only by the appended claims.

I claim:

1. An automatic recloser comprising a pair of cooperating contacts having an engaged and disengaged position, said contacts biased to engaged position, a primary latch to maintain said contact in said disengaged position, a timer mechanism to control the release of said primary latch, said timer ineffective to release said latch after a predetermined number of operations of said recloser to thereby maintain said recloser in lock-out position, means to release said primary latch independent of said timer mechanism, said means comprising a lever and a pull ring, said lever actuated by said pull ring to release said pirmary latch; biasing means to maintain said lever in a neutral position, said lever effective to permit reclosing of said recloser when said pull ring is operated, said timer mechanism operative to time delay the initial opening of said recloser immediately following release from lock-out and after a predetermined interval following release from lock-out said timer is ineffective to time delay the initial opening operation.

2. An automatic recloser comprising a pair of cooperating contacts having an engaged and disengaged position, said contacts biased to engaged position, a primary latch to maintain said contact in said disengaged position, a timer mechanism to control the release of said primary latch, said timer ineffective to release said latch after a predetermined number of operations of said recloser, to thereby maintain said recloser in lock-out position, means to release said primary latch independent of said timer mechanism, said means comprising a lever and a pull ring, said lever actuated by said pull ring to release said primary latch; said lever acting directly on said primary latch to transfer a roller latch from engagement with a first latch surface to a latch surface on said lever, biasing means for said lever to release said latch roller when the force on said pull ring is released.

3. An automatic recloser comprising a pair of cooperating contacts having an engaged and disengaged position, said contacts biased to engaged position, a primary latch to maintain said contact in said disengaged position, a timer mechanism to control the release of said primary latch, said timer ineffective to release said latch after a predetermined number of operations of said recloser, to thereby maintain said recloser in lock-out position, means to release said primary latch independent of said timer mechanism, said means comprising a lever and a pull ring, said lever actuated by said pull ring to release said primary latch; said primary latch comprised of an arm and a roller latch, said arm and said lever having a common fixed pivot, said timer mechanism operative to time delay the initial opening of said recloser immediately following release from lock-out and after a predetermined interval following release from lock-out said timer is ineffective to time delay the initial opening operation.

4. An automatic recloser comprising a pair of cooperating contacts having an engaged and disengaged position, said contacts biased to engaged position, a primary latch to maintain said contact in said disengaged position, a timer mechanism to control the release of said primary latch, said timer ineffective to release said latch after a predetermined number of operations of said recloser, to thereby maintain said recloser in lock-out position, means to release said primary latch independent of said timer mechanism, said means comprising a lever and a pull ring, said lever actuated by said pull ring to release said primary latch; said primary latch comprised of an arm and a roller latch, said arm and said lever having a common fixed pivot; said lever effective to engage said arm when force is applied to said pull ring, said roller latch released from said arm when said lever is rotated about said fixed pivot by said pull ring, said lever having a biasing means to maintain said lever in neutral position when no force is applied to said pull ring.

5. An automatic recloser comprising a pair of cooperating contacts having an engaged and disengaged position, said contacts biased to engaged position, a primary latch to maintain said contact in said disengaged position, a timer mechanism to control the release of said primary latch, said timer ineffective to release said latch after a predetermined number of operations of said recloser, to thereby maintain said recloser in lock-out position, means to release said primary latch independent of said timer mechanism; said primary latch comprised of an arm and a roller latch, said means comprised of a lever and a pull ring, said arm and said lever rotatably mounted on a common fixed pivot, said pull ring effective to rotate said lever into engagement with said arm to release said latch and effect instantaneous reclosing of said recloser from lock-out position.

6. An automatic recloser comprising a pair of cooperating contacts having an engaged and disengaged position, said contacts biased to engaged position, a primary latch to maintain said contact in said disengaged position, a timer mechanism to control the release of said primary latch, said timer ineffective to release said latch after a predetermined number of operations of said recloser to thereby maintain said recloser in lock-out position, means to release said primary latch independent of said timer mechanism, said means comprising a lever and a pull ring, said lever actuated by said pull ring to release said primary latch; biasing means to maintain said lever in a neutral position, said biasing means effective to permit reclosing of said recloser when said pull ring is released.

7. An automatic recloser comprising a pair of cooperating contacts having an engaged and disengaged position, said contacts biased to engaged position, a primary latch to maintain said contact in said disengaged position, a timer mechanism to control the release of said primary latch, said timer ineffective to release said latch after a predetermined number of operations of said recloser, to thereby maintain said recloser in lock-out position, means to release said primary latch independent of said timer mechanism, said means comprising a lever and a pull ring, said lever actuated by said pull ring to release said primary latch; said primary latch comprised of an arm and a roller latch, said arm and said lever having a common fixed pivot.

References Cited in the file of this patent

UNITED STATES PATENTS

| | | |
|---|---|---|
| 2,251,171 | Sillers et al. | July 29, 1941 |
| 2,468,498 | Kyle et al. | Apr. 26, 1949 |
| 2,693,514 | Smith | Nov. 2, 1954 |
| 2,696,536 | Coggeshall et al. | Dec. 7, 1954 |
| 2,738,394 | Matthews | Mar. 13, 1956 |